United States Patent
Bunte et al.

(10) Patent No.: US 9,467,309 B2
(45) Date of Patent: Oct. 11, 2016

(54) NETWORK DISTRIBUTOR

(71) Applicant: Beckhoff Automation GmbH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 0 days.

(21) Appl. No.: 14/736,416

(22) Filed: Jun. 11, 2015

(65) Prior Publication Data

US 2015/0365252 A1 Dec. 17, 2015

(30) Foreign Application Priority Data

Jun. 16, 2014 (DE) .......................... 10 2014 108 457

(51) Int. Cl.
*H04L 12/40* (2006.01)
*H04L 12/64* (2006.01)

(52) U.S. Cl.
CPC .................. *H04L 12/6418* (2013.01)

(58) Field of Classification Search
CPC ........... H04L 12/40013; H04L 12/189; H04L 12/40019; H04L 12/40202; H04L 45/70
USPC ................ 709/208, 209, 228, 229, 248, 249
See application file for complete search history.

(56) References Cited

U.S. PATENT DOCUMENTS

| | | | |
|---|---|---|---|
| 6,836,862 B1 * | 12/2004 | Erekson | H04L 1/24 714/704 |
| 8,015,324 B2 | 9/2011 | Klotz et al. | |
| 8,521,934 B1 * | 8/2013 | Ni | G06F 13/28 710/105 |
| 2004/0258185 A1 * | 12/2004 | Kihara | H04B 1/1027 375/371 |
| 2010/0332706 A1 * | 12/2010 | Hering | H03M 13/09 710/106 |
| 2012/0320933 A1 * | 12/2012 | Magee | H04L 12/413 370/503 |

FOREIGN PATENT DOCUMENTS

| | | |
|---|---|---|
| EP | 2028797 A1 | 2/2009 |
| EP | 2362585 B1 | 4/2013 |
| EP | 2688250 A1 | 1/2014 |

OTHER PUBLICATIONS

Office Action from related German patent application No. DE 102014108457.8, Applicant Beckhoff GmbH, mailed Jan. 30, 2015 (8 pages).

* cited by examiner

*Primary Examiner* — Ruolei Zong
(74) *Attorney, Agent, or Firm* — Dorsey & Whitney LLP

(57) ABSTRACT

A data network comprises a master, a network distributor and a plurality of network users. The network distributor is connected to a master data path, a first and a second user data path. A method for transferring data telegrams in this data network includes the reception of a first master data telegram sent by the master through the network distributor, the compilation transfer of a first and a second transmission data telegram through the network distributor, and the reception of a first and a second reception data telegram through the network distributor. Further, the network distributor compiles a second master data telegram and transfers it to the master. In this connection, an access indicator of the second master data telegram represents accesses of the network user to the first master data telegram, the first and second transmission data telegrams as well as the first and second reception data telegrams.

22 Claims, 7 Drawing Sheets

NETWORK DISTRIBUTOR

CROSS-REFERENCE TO RELATED APPLICATION

This application claims priority to German Patent Application DE 10 2014 108 457.8, filed Jun. 16, 2014, entitled NETZWERKVERTEILER, which is incorporated by reference herein, in the entirety and for all purposes.

FIELD

The present invention relates to a method for transferring data telegrams in a data network using a network distributor, to a network distributor and to a data network having a network distributor.

BACKGROUND

Data networks are, inter alia, used for networking devices in automation technology. Such data networks are also referred to as field bus systems and are, inter alia, standardized in IEC Standard IEC 61158.

In automation technology, sensor/actuator level devices such as I/O modules, measuring transducers, drives, valves and user terminals, inter alia, are connected with control level devices, such as industry PCs, via the data network. In order to allow process control in industrial manufacturing, real-time communication of the network users is required, where the data transmission is completed within predefined periods of time. For a high-performance data network in automation technology, a high data transmission rate and a low error rate during data transmission are also required.

Data networks in automation technology are frequently based on the Ethernet standard. An Ethernet-based field bus system that allows real-time communication is for example the EtherCAT fieldbus according to IEC 61158.

As a rule, data networks in automation technology are designed as master-slave networks, in which one or more network users as masters control the data exchange in the data network. The remaining network users are passive network users and exchange payload with a master only upon request by the latter. These so-called slaves receive payload sent by the master and send, upon request by the master, payload directed to the latter.

As a rule, the data exchange is realized by means of data telegrams. Apart from the payload, these include additional control data. The control data may here include the type of telegram, the addresses of the targeted network users and/or a checksum. This control data is used to control the distribution of the data telegram via the data network and the processing of the data telegrams by the network users. Moreover, the data telegrams may have one or more access indicators. These may represent for example the type and the number of the data accesses to the data telegram that were carried out.

The network users may be located within the data network for example in a ring topology or in an open ring topology, which is referred to as linear topology. In a master-slave network in linear topology, the data telegrams pass, starting from the master, through all the network users of the data network in order and are subsequently returned to the master. In the course of this, each individual data telegram passes through all the network users at least twice.

A master-slave network in linear topology may also include branching points, where a network distributor may be located that is connected to three or more data paths. If the network distributor receives a data telegram from a master via a first data path, it will forward the data telegram, if needed after processing, onto one of the other data paths, where the data telegram passes through all the network users connected to this data path, so that they can access the payload of the data telegram, and subsequently the data telegram is sent back again to the network distributor.

Once the data telegram has been received again, the network distributor forwards the data telegram for data exchange to the network users of the next data path. Once all the data paths have been served in this way, the network distributor finally sends the data telegram back to the master via the data path that establishes the link to the master. In such a branched data network in linear topology, a data telegram also passes successively through all the network users. In the course of this, it passes through all the network users at least twice, through the network distributor at the branching point at least three times.

In the case of a master-slave network in linear topology, the run time of the data telegram may become rather long, especially if a large number of network users are connected to the data network.

SUMMARY

It is the object of the invention to provide an improved method for transferring data telegrams in a data network, an improved network distributor and an improved network having a network distributor.

These objects are achieved by means of a method for transferring data telegrams in a data network, a network distributor and a data network. The dependent claims indicate various developments thereof.

EXAMPLES

In a method for transferring data telegrams with a payload field, a first master data telegram sent by the master is received by the network distributor in a data network having network users, a network distributor and a master. The network distributor includes a master interface, via which it is connected to the master and via which it receives the master data telegram. Further, the network distributor has a first user interface that is connected to at least one first network user over a first user data path, and a second user interface that is connected to at least one second network user over a second user data path. The method further comprises the compilation of a first and second transmission data telegrams by the network distributor. It also comprises the transfer of the first transmission data telegram over the first user data path to the first network user and the transfer of the second transmission data telegram over the second user data path to the first network user by the network distributor. As a further step, the method comprises the reception of a first reception data telegram sent by the first network user over the first user data path via the first user interface, and of a second reception data telegram sent by the second network user over the second user data path via the second user interface through the network distributor. The method also comprises the compilation of a second master data telegram by the network distributor. Further, it comprises the transfer of the second master data telegram via the master interface to the master by the network distributor. The first master data telegram, the second master data telegram, the first and second transmission data telegrams and the first and second reception data telegrams each include a counter field with an access indicator. This access indicator shows an access to the payload field by one of the network users. Moreover, the access indicator of the second master data telegram is compiled in order to represent accesses to payload fields of the first master data telegram, the first transmission data telegram, the second transmission data telegram, the first reception data telegram and the second reception data telegram.

The method advantageously allows the network distributor to dispatch, instead of the first master data telegram, one transmission data telegram each over the first and the second user data paths. These transmission data telegrams may all be received back by the network distributor as a first and second reception data telegrams, for example after having been processed by all the network users of the respective user data path. Instead of the two reception data telegrams, the network distributor can return the second master data telegram to the master user using the present method.

In a master-slave network in linear topology, the network distributor would initially dispatch the first master data telegram over one of the user data paths, would wait until it receives the master data telegram back over this user data path and would subsequently dispatch it to the further network users over the other user data paths. The method now advantageously allows the network user of the first and second user data paths to be served independently from each other and in particular at the same time. Thus, the method can markedly reduce the run time of a data telegram through the data network. Moreover, in the case of a loss of one of the data telegrams on one user data path, the data telegram of the other user data path can continue to be transferred, so that in such a case, the master could continue to communicate at least with some of the network users.

Since the access indicator of the second master data telegram represents accesses to payload fields of the first master data telegram, of the first transmission data telegram, of the second transmission data telegram, of the first reception data telegram and of the second reception data telegram, the master can advantageously process the second master data telegram as if it had passed successively through all the network users of the data network.

In one embodiment of the method, the access indicator of the second master data telegram corresponds to at least the sum of the access indicator of the first master data telegram, the access indicator of the second reception data telegram minus the access indicator of the first transmission data telegram and the access indicator of the second reception data telegram minus the access indicator of the second transmission data telegram.

The data telegrams may be formed for example as EtherCAT data telegrams and the access indicators may for example be numerical values. The access indicators of the counter field of the first and second reception data telegrams may each represent the accesses carried out onto the respective data telegrams. The difference from the access indicators of the first reception data telegram and of the second transmission data telegram may for example constitute the number and type of the accesses to the first transmission data telegram by the network users of the first user data path. Analogously, the difference of the access indicators of the second reception data telegram and of the second transmission data telegram may represent the type and number of the accesses to the second transmission data telegram by the network users of the second user data path.

Since the access indicator of the second master data telegram comprises at least the sum of these differences and of the access indicator of the first master data telegram, the access indicator of the second master data telegram advantageously represents the type and number of the accesses to the first and second transmission data telegrams that were altogether carried out by the network users of the master data path and of the first and second user data paths.

In a development of this embodiment of the method, the access indicator of one of the transmission data telegrams is zero. In addition, for example the access indicator of the other transmission telegram may correspond to the access indicator of the first master data telegram and all the access indicators may be formed by numerical values. In such a case, the access indicator of the second master data telegram may be formed after the reception of the two reception data telegrams by adding the access indicators of the two reception data telegrams together. This allows, in an advantageously simple manner, the count of the second master data telegram to represent type and number of the accesses carried out both to the first master data telegram and to the first and second transmission data telegrams.

In one embodiment of the method, the payloads of the first and second transmission data telegrams each comprise at least part of the payload of the first master data telegram and the payload of the second master data telegram comprises part of the payload of the first reception data telegram and part of the payload of the second reception data telegram.

As a result, it is advantageously possible for the first and second transmission data telegrams to each include the payload of the first master data telegram that is intended for the network users of the corresponding user data path. Analogously, the second master data telegram may as a result advantageously contain the payload that was written by the users of the first and second transcriber data paths into the first and second reception data telegrams, respectively. As a result, the transmission and reception data telegrams can advantageously completely replace the sequential dispatch of the first master data telegram via the two user data paths.

In a further embodiment of the invention, the first and second transmission data telegrams are compiled in an advantageously simple manner as a result of the fact that the payload field of one or both of the transmission data telegrams is a copy of the payload field of the first master data telegram.

In a further embodiment, one of the two transmission data telegrams is compiled in a particularly simple and time-saving manner by transmitting the first master data telegram as a transmission data telegram directly via the corresponding user interface.

In a further embodiment of the method, the payload field of the first reception data telegram is ORed with the payload field of the second reception data telegram during the compilation of the payload field of the second master data telegram by the network distributor. The OR operation of the payload fields may here for example be carried out in a bitwise manner. The data telegrams may for example be read telegrams, by means of which payload is transmitted to the master. It is possible here that the payload field of the first master data telegram has been completely filled with zeros during initialization by the master. By way of an OR operation, a second master data telegram can advantageously be compiled in a simple and time-saving manner, which as payload contains all the data that has been inserted into the data telegrams by the network users of the master data path and of the two user data paths.

In a further embodiment of the method, the payload fields of the first and second reception data telegrams are ORed during the compilation of the second master data telegram by the network distributor and are multiplied by a first and second data masks, respectively. As a result it can be achieved in a particularly simple and time-saving manner that the second master data telegram contains all the payload that was written into the corresponding data telegrams by the network users of the master data path and the two user data paths.

In a further embodiment of the method, the payload fields of the first and second reception data telegrams are ORed by the network distributor during the compilation of the second master data telegram. In addition, the network users of one of the user data paths are arranged in a line and a last network user of the line converts one of the transmission data telegrams of the network distributor into one of the reception data telegrams, wherein at least part of the payload field of the one of the reception data telegrams is set to zero and returns the one of the reception data telegrams to the network distributor, and the one of the transmission data telegrams and one of the reception data telegrams passes through all the network users of the one of the user data paths and the network users only have read access to the payload field of the one of the transmission data telegrams and only have write access to the payload field of the one of the reception data telegrams.

Such an embodiment allows a combined read/write access to the network users of the user data paths to be carried out in an advantageously simple manner. By writing zeros onto part of the payload field of the reception data telegram, the write data present there will be deleted. As a result it can be achieved in a simple manner that this write data will no longer be taken into consideration during the OR operation on the reception data telegrams by the network distributor.

In a further embodiment of the method, the data telegrams are autoinc data telegrams which have at least one address value and which address the network users via a position within the network. In this connection, an address value of the second transmission data telegram corresponds to an address value of the first master data telegram plus a number of network users that are connected to the first user data path. As a result, it is advantageously achieved that after distributing the master data telegram to the two transmission data telegrams, the second transmission data telegram addresses the network users of the second user data path in the same way as if it had initially completely passed through the first user data path.

In a development of this embodiment of the method, an address value of the second master data telegram corresponds to the sum of an address value of the first master data telegram and the number of network users connected to the first user data path, plus a number of network users connected to the second user data path. As a result, it can advantageously be ensured that the address value of the second master data telegram represents the total number of network users that were passed through by the data telegrams on the master data path, the first and the second user data paths. The master can determine by evaluating the address value of the second master data telegram whether all the network users of the data network have been properly passed through.

In a further embodiment of the method, the network distributor compiles the second master data telegram after having received the first reception data telegram via the first user interface or after receiving the second reception data telegram via the second user interface, if no error occurs during the reception of the respectively other reception data telegram via the respectively other user interface. As a result, it can advantageously be ensured that during the transfer of data telegram sequences, a second master data telegram is compiled only if an error-free transmission of the reception data telegram has taken place.

According to one embodiment of the method, such an error may consist in that the network distributor, after having received the first or second reception data telegram via the first and second user interface, respectively, does not receive a reception data telegram via the respectively other user interface within a specified waiting time. This may for example be the case if a transmission or reception data telegram has been lost during the transmission of a data telegram sequence on one of the user data paths. If in such a case the second reception data telegram is not compiled it can advantageously be ensured that only reception data telegrams are involved in the compilation of the second master data telegram, which occupy the same space within the data telegram sequence.

According to another embodiment of the method, the first reception data telegram and the second reception data telegram include identifiers, and the error that prevents a compilation of the second master data telegram consists in the fact that the identifier of the reception data telegram received via the respectively other user interface does not match an expected identifier. As a result it can be ensured in an advantageously simple manner during the transfer of a data telegram sequence that for the compilation of the second master data telegram, only reception data telegrams are involved that occupy the same space within the data telegram sequence.

In a further embodiment of the method, the data network is an Ethernet network, in particular an EtherCAT network. This advantageously allows the method to be used in a data network that supports real-time communication of the network users. In the course of this, the data network may for example be used as a field bus system in automation technology.

In a further embodiment of the method, the first and second transmission data telegrams are simultaneously transferred by the network distributor. As a result, there will only be an advantageously short latency period during transfer, which allows a high data transmission rate of the entire data network to be achieved.

In a further embodiment of the method, the network distributor has a memory area and the first reception data telegram received via the first user interface is stored in the memory area by the network distributor, if it is received before the second reception data telegram to be received via the second user interface. The second reception data telegram received via the second user interface is stored in the memory area by the network distributor, if it is received before the first reception data telegram to be received via the first user interface. This advantageously allows both reception data telegrams to be involved in the compilation of the second master data telegram, even if they are not simultaneously received via the first and second user interfaces, respectively.

In a further embodiment of the method, the network distributor is integrated into a network user that carries out read and/or write accesses to the payload field of one or more of the first or second master data telegrams, the first or second transmission data telegrams or the first or second reception data telegrams. This advantageously allows the distribution function to be integrated in a network user, which can in addition take on even further functions in the data network. For example, the network user could be used in a field bus system for driving one or more sensors or actuators. This advantageously reduces the overall number of components needed for the design of the data network.

A network distributor having a master interface, a first user interface and a second user interface is designed to carry out a method according to any one of the preceding claims. As a result it is possible to send, instead of the first master data telegram, the first and the second transmission data telegram via the two user interfaces. As a result, data telegrams can advantageously be transmitted independently and simultaneously over both user data paths. Moreover, the second master data telegram may be compiled from the reception data telegrams simultaneously transferred over the two user data paths. This enables the payload to be transferred in an advantageously short time to the network users of the data network and thus a high data throughput of the data network to be realized.

A data network comprises such a network distributor and a master and at least one first and one second network user, with the master being connected to a master data path, the first network user being connected to a first user data path and the second network user being connected to a second user data path, and wherein the network distributor is connected, via the master interface, to the master data path, via the first user interface to the first user data path, and via the second user interface to the second user data path. As a result it becomes possible to realize a data network in which payload is transferred within an advantageously short run time to all the network users of the data network.

BRIEF DESCRIPTION OF THE DRAWINGS

The invention will be explained in more detail below with reference to the figures, wherein.

DETAILED DESCRIPTION

Figure 1:
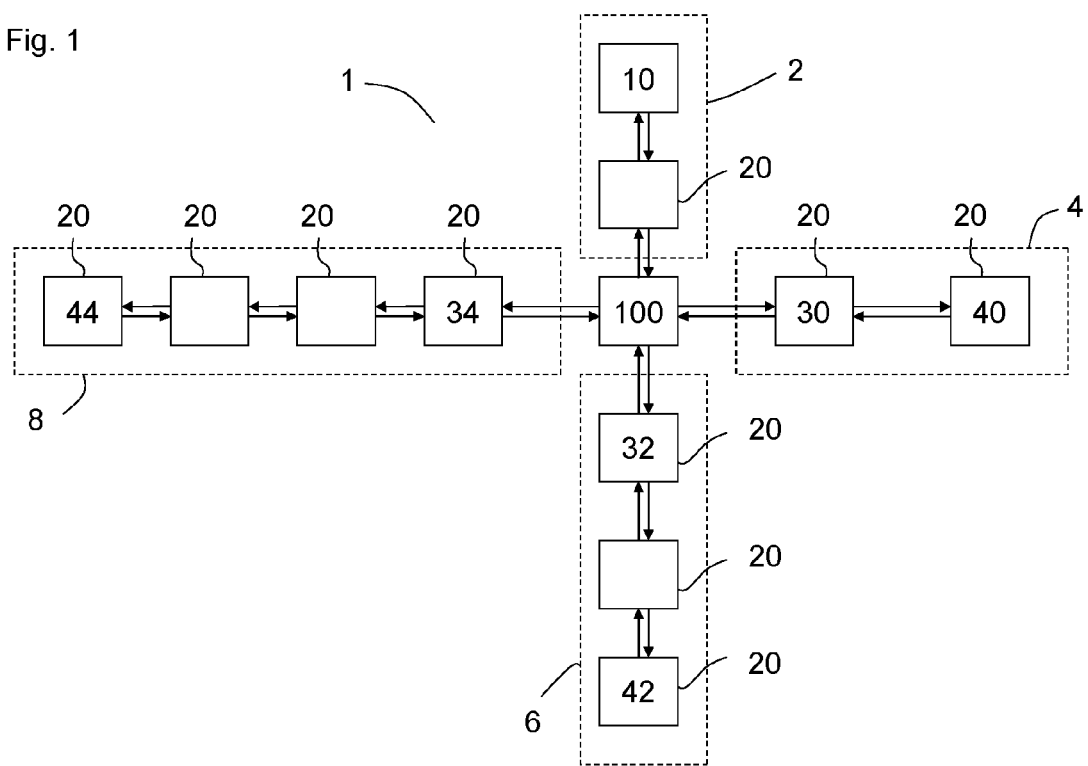
FIG. 1 shows a schematic view of a data network.

In automation technology, field bus systems are increasingly used, in which devices of the machine periphery, which are arranged in a distributed manner, communicate via a field bus with automation, engineering and visualization systems. Devices of the machine periphery may for example be actuators such as motors or valves. Moreover, various sensors that register process parameters such as temperatures, pressures, positions of workpieces or the speeds thereof, may be connected to the field bus system. Especially if control loops are to be connected via the bus system, i.e. a value detected by a sensor is to be controlled to a specified design value via an actuator, a synchronized communication that is as fast as possible is required via the bus system. Ideally, real-time communication with update rates as short as possible and small cycle fluctuations are realized, with data transmission from the transmitter to the receiver being completed within a defined period of time.

As a data network for a field bus system, for example an Ethernet network as described in the standard IEEE 802.3 may be used. One Ethernet protocol variant with real-time capability is the EtherCAT standard. In an Ethernet network, payload to be transferred is encapsulated in data packets with a specified format. These data packets will also be referred to below as data telegrams. According to the Ethernet standard, the data telegrams have a data length of up to 1500 bytes. However, it is also possible to use non-standardized, longer data telegrams, so-called "Jumbo frames". In addition to the payload, a data telegram includes control data comprising a start identifier, a destination and/or a source address, a processing command and data fields for error detection.

During access control to a data network according to the master-slave principle, active and passive network users are distinguished. The active network users, referred to below as masters, have access authorization to the data network and can control data traffic in the data network by transmitting data telegrams without an external request. Such a master may for example be an industrial PC that is used as a process automation controller on a production line.

The passive network users or slaves do not have access authorization to the data network. They can merely read out payload from data telegrams addressed to them or can transfer payload to a master that has requested it. As a rule, passive network users are machine periphery devices, e.g. I/O devices, valves, drives and measurement transducers.

In order to transmit payload to one or more network users, the master compiles a data telegram into which it inserts payload to be written into the network user(s), referred to below also as write payload. The network user(s) has or have read access to the data telegram and store(s) the payload directed to them in an internal memory. Such a data telegram will be referred to below as a write data telegram, because it is used by the master for writing payload into the network users. An example of a write data telegram according to the EtherCAT standard is a "logical write" data telegram (LWR data telegram).

In order to read in payload from one or more network users, the master transmits a read data telegram, in which the addressed network user(s) insert(s) the payload to be sent to the master user. Such payload to be sent to the master will also be referred to below as read payload. A read data telegram according to the EtherCAT standard would for example be a "logical read" data telegram (LRD data telegram).

Write and read data telegrams may also be combined in a write-read data telegram. When doing so, the master user initializes the write-read data telegram with the write payload to be sent to the respective user. The addressed network users have read access to the data telegram and store the write payload directed to them in their internal memory. Moreover, they write the read payload to be transferred to the master user into the data telegram and forward the latter. A write-read data telegram according to the EtherCAT standard is for example a "logical ReadWrite" data telegram (LRW data telegram). In an LRW data telegram, the read access is as a rule carried out by the network user prior to the write access.

If the data network has been designed in ring topology, the individual network users are connected to each other in series. The first and the last network users are then connected to the master and respectively one further network user, whilst all the other network users are joined together with two adjacent network users. A variant of the ring topology is linear topology, in which one of the end-side network users is connected to the master, the second end-side user is merely connected to another network user. The transmission of a data telegram from this second end-side network user back to the master is then carried out via all the network users of the line, with the network users merely forwarding the data telegram. A network in linear topology may also have branch points, with a network user being connected at the branch point to three or more network users, each of which define their own data path.

FIG. 1 shows a data network 1 that includes a master data path 2, a first user data path 4, a second user data path 6 and a third user data path 8. Each of the data paths 2, 4, 6, 8 has a number of network users 20. The master data path 4 comprises a master 10, the first user data path 2 comprises a first network user 30 and a first end user 40. The second user data path 6 comprises a second network user 32 as well as a second end user 42, whereas the third user data path 8 comprises, inter alia, a third network user 34 and a third end user 44.

Figure 2:
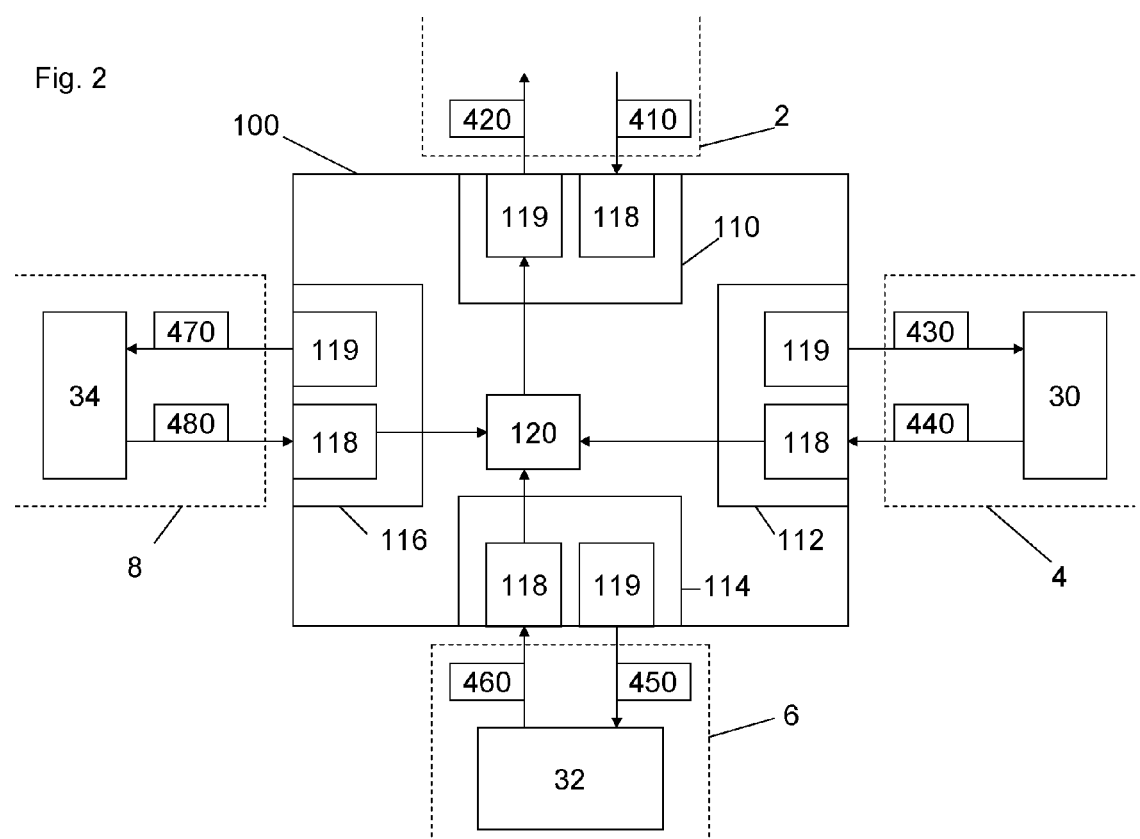
FIG. 2 shows a schematic view of a network distributor.

The data paths 2, 4, 6, 8 are connected to each other via a network distributor 100. FIG. 2 shows a schematic view of the network distributor 100. It has a master interface 110, a first user interface 112, a second user interface 114 and a third user interface 116. The network distributor 100 is connected to one of the network users 20 of the master data path 2 via the master interface 110, is connected to the first network user 30 of the first user data path 4 via the first user interface 112, is connected to the second network user 32 of the second user data path 6 via the second user interface 114 and is connected to the third network user 34 of the third user data path 8 via the third user interface 116.

Each of the interfaces 110, 112, 114 and 116 has a reception module 118 and a transmission module 119. Data telegrams may be received through the network distributor 100 via the reception module 118 and transmitted via the transmission module 119. Instead of designing the reception modules 118 and the transmission modules 119 separately, it would also be possible to communicate with connected network users 20 via a combined transmission and reception module. In addition, the network distributor 100 also has a memory area 120 in which received data telegrams can be buffered.

If the data network 1 is an EtherCAT network, the network users 20 may be EtherCAT slave controllers. The network users 20 may for example serve as interfaces to machine periphery devices. For example, the network users 20 may be designed for the connection of EtherCAT application controllers.

The master 10 of the data network 1 may be designed to take over control and steering tasks in the data network 1. For example, the master 10 may be designed to configure the network users 20 and the network distributor 100 and to coordinate data communication within the network 1.

Figure 3:
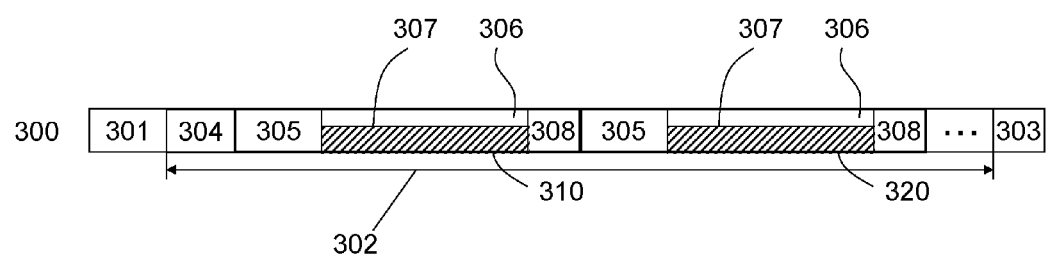
FIG. 3 shows a schematic view of a data telegram including payload.

FIG. 3 shows a schematic view of a data telegram 300 as can be used for data transmission in the data network 1. The data telegram 300 may for example be an Ethernet data telegram and in particular an EtherCAT data telegram. The data telegram 300 includes a data telegram header data field 301 and a checksum field 303. The data telegram header data field 301 is here located at the beginning of the data telegram 300, the checksum field 303 is located at the end of the data telegram 300. For the transmission of payload 306, the data telegram 300 includes a payload area 302 that is located between the header data field 301 and the checksum field 303 of the data telegram 300. The data telegram header data field 301 and the checksum field 303 may contain control data for controlling the distribution of the data telegram 300 over the data network and the processing of the data telegram 300 by the network users.

If the data telegram 300 is an Ethernet data telegram, the data telegram header data field 301 may for example have a length of 14 bytes, the payload area 302 may have a length between 46 bytes and 1500 bytes and the checksum field 303 may have a length of 4 bytes.

If the data telegram 300 is an EtherCAT data telegram, the payload area 302 may have a data area header data field 304 and at least one datagram. FIG. 3 shows a first datagram 310 and a second datagram 320. The data area header data field 304 may for example have a length of 2 bytes and may also contain control data.

Each of the datagrams 310, 320 comprises a datagram header data field 305, a subsequent payload field 306 and a counter field 308 at the end of the datagrams 310, 320. The payload 307 to be transmitted by the data telegram 300 is encapsulated in the payload fields 306 of the datagrams 310, 320.

The datagram header data fields 305 may contain control data, such as an address value for addressing one or more network users 20, which are to carry out a data exchange with the payload field 306 of the datagram 310, 320 concerned. Moreover, the datagram header data fields 305 may contain a processing command that determines in which way an addressed network user 20 is to access the payload field 306 of the corresponding datagram 310, 320. Such a processing command can e.g. trigger a read access (LWR data telegram), a write access (LRD data telegram) or a combined read-write access (LRW data telegram) through the addressed network user 20.

As a rule, not all the datagrams 310, 320 of a data telegram 300 have the same processing command. Consequently, the first datagram 310 may for example be designed for being processed only through a read access by the addressed network users 20, whereas the second datagram 320 allows a combined read-write access. For the sake of simplicity, reference will be made below only to data telegrams 300, the datagrams of which have a unified processing command, so that for example the designations LWR data telegram, LRD data telegram and LRW data telegram may continue to be used.

If the data telegram 300 is an EtherCAT data telegram, a plurality of network users 20 may be addressed by a datagram 310, 320 via logical addressing. The addressed network users 20 will then read payload 307 to be received from a defined memory area of the payload field 306 and write payload 307 to be sent into a defined memory area of the payload field 306. For this, the memory areas for the payload 307 to be received and to be sent do not need to be identical. Which memory areas of a datagram are to be written to or read by a network user 20 using a certain address value will be determined by the master 10 via a configuration of the corresponding network user 20.

The counter fields 308 of the datagrams 310, 320 register a successful access to the payload fields 306 of the corresponding datagrams 310, 320. For this, the counter fields may contain as access indicators any desired identifiers such as numbers, letter combinations or the like. The counter fields 308 do not have to consist of a coherent data area of the data telegram 300. For example, it is also possible to detect a separate access indicator for each network user 20, which is in each case deposited in its own data area of the counter field 308. These data areas of the counter field 308 may for example be arranged to be distributed over the payload field 306. For example, the access indicator of each of the network users 20 may be located after the payload 307 that is accessed by the corresponding network user.

If the data telegrams 300 are EtherCAT data telegrams, then the counter field may have a length of 2 bytes and may have a numerical value as an access indicator. In this case, the counter field 308 is referred to as a "working counter". An access indicator of the counter field 308 may for example be incremented if at least one byte or one bit of the payload 307 of the corresponding datagram 310, 320 has been successfully read and/or written by the network user 20.

For example, in the case of a successful access to a write or read data telegram, the access indicator may in each case be incremented by one. If it is a combined write-read data telegram, the access indicator may for example be incremented by one if the payload 307 has been successfully written into the corresponding datagram 310, 320 by the network user 20, it may be incremented by two if the payload 307 has been successfully read out of the payload area 306 of the corresponding datagram 310, 320, and may be incremented by three, if both accesses were successful. As a result of a comparison of the access indicator of the counter field 308 of a returning data telegram 300 with an expected access indicator, the master 10 may determine how many accesses to the payload field 306 of each datagram 310, 320 were successful.

As a rule, a data exchange in the data network 1 is initiated by the master 10 sending out a first master data telegram 410. If this is a write data telegram, for example an LWR or LRW data telegram, the payload fields 306 of the first master data telegram 410 contain the payload 307 that is to be transferred to the network users 20. In the case of a read data telegram, such as an LRD data telegram, the payload fields 306 of the first master data telegram 410 may be filled with zeros.

Figure 4:
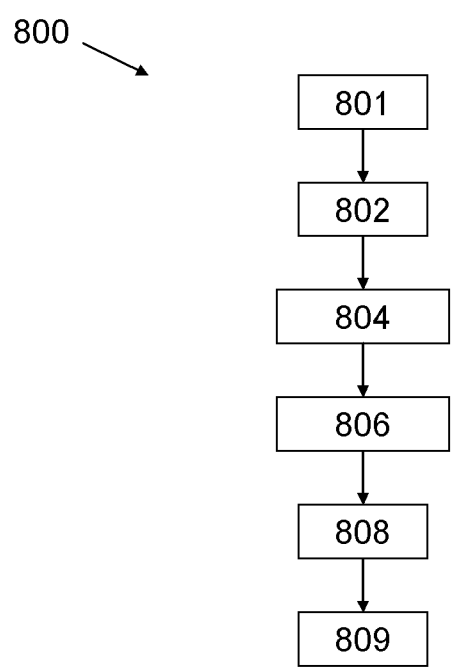
FIG. 4 shows a schematic flow diagram of a method for transferring data telegrams in a data network.

FIG. 4 shows a schematic flow diagram of a method 800 for transferring the data telegrams 300 by the network distributor 100. The master data telegram 410 reaches the network distributor 100 for the first time over the master data path 2 at the master interface 110. The reception 801 of the first master data telegram 410 by the network distributor 100 constitutes a first method step. As a second method step, the network distributor 100 carries out a compilation 802 of a first transmission data telegram 430, a second transmission data telegram 450 and a third transmission data telegram 470.

The third method step consists in the transmission 804 of the first transmission data telegram 430 via the first user interface 112 to the first network user 30, of the second transmission data telegram 450 via the second user interface 114 to the second network user 32 and of the third transmission data telegram 470 via the third user interface 116 to the third network user 34 by the network distributor 100.

In a fourth method step, the reception 806a of a first reception data telegram 440 sent by the first network user 30 over the first user data path 4 via the first user interface 112, of a second reception data telegram 460 sent by the second network user 32 over the second user data path 6 by the second user interface 114, and of a third reception data telegram 480 sent by the third network user 34 over the third user data path 8 via the third user interface 160 by the network distributor 100 takes place.

A fifth method step is constituted by compiling 808 a second master data telegram 420 by the network distributor 100. In a sixth method step, the second master telegram 420 is transferred 809 via the master interface 110 to the master 10 by the network distributor 100.

The network distributor 100 compiles the transmission data telegrams 430, 450, 470 in order to transfer the payload 307 of the first master data telegram 410 to the network users 20 of the user data paths 4, 6, 8. In the course of this, the transmission data telegrams 430, 450, 470 may be transmitted substantially at the same time via the first user interface 112, the second user interface 114 and the third user interface 116, respectively.

The transmission data telegrams 430, 450, 470 may be compiled for example as copies of the first master data telegram 410. The master data telegram 410 may for example be directly forwarded as the first transmission data telegram 430 via the first user interface 112, and the second transmission data telegram 450 and the third transmission data telegram 470 may be compiled as copies of the first master data telegram 430. The process of compiling and forwarding the transmission data telegrams 430, 450, 470 may be started as soon as the reception of the first master data telegram 410 has started. This leads to a minimal delay in the forwarding of the first master data telegram 410 by the network distributor 100.

If the transmission data telegrams 430, 450, 470 are compiled as a copy of the master data telegram 410, they have the same telegram structure as the first master data telegram 410. The telegram structure in particular includes the number of datagrams and the length thereof. Also, at least part of the control data, such as address values and processing commands of the respective datagram header data fields 370, are identical.

However, the transmission data telegrams 430, 450, 470 do not necessarily have to contain all the payload 307 of the first master data telegram 410. What is essential is merely that the payload 307 to be transferred to the network users 20 of the respective user data paths 4, 6, 8 is included.

Subsequently, the transmission data telegrams 430, 450, 470 can each pass through all the network users 20 of the first user data path 4, of the second user data path 6 and of the third user data path 8, respectively, and can exchange payload 307 with these network users 20. If the first transmission data telegram 430 reaches the first end user 40 of the first user data path 4, then the first end user 40 can, after a completed data access, return the first transmission data telegram 430 as a first reception data telegram 440 over the first user data path 4 in the direction of the network distributor 100. Correspondingly, the second end user 42 can return the second transmission data telegram 450 as a second reception data telegram 460 and the third end user 44 can return the third transmission data telegram 470 as a third reception data telegram 480 to the network distributor 100. In the case of such an approach, the telegram structure as well as the address values and the processing commands of the datagrams are again preserved.

The network distributor 100 can then compile the second master data telegram 420 by taking over from the reception data telegrams 440, 460, 480 in each case the payload 307 that is to be returned to the master 10 into the payload area(s) 306 of the second master data telegram 420. To this end, the incoming reception data telegrams 440, 460, 480 can be buffered in the memory area 120 until the reception of the last reception data telegram 440, 460, 480 that is needed for the compilation of the second master data telegram 420 has at least started. The compilation and transfer of the second master data telegram 420 can then be carried out substantially synchronously with the reception of the last of the reception data telegrams 440, 460, 480. The memory area 120 may here for example be formed as a first-in-first-out memory (FIFO memory).

Altogether, in the exemplary embodiment of the method 400, a first master data telegram 410 sent out by the master 10 no longer passes successively through all the network users 20 of the data network 1, as would be the case in a conventional data network in linear topology, but rather the payload 307 of the first master data telegram 410 reaches the network users 20 of the individual user data paths 4, 6, 8 via the transmission data telegrams 430, 450, 470 in parallel and independently. At the same time, the payload 307 directed to the master 10 can be transmitted independently and in parallel over the user data paths 4, 6, 8 to the network distributors 100 and can subsequently be forwarded from there to the master 10.

Thus, data communication over the data network 1 is accelerated compared to a conventional linear topology, in which a data telegram 300 successively passes through all the network users 20. This is the case above all if the data network 1 has a structure that is branched further and has a plurality of network distributors 100. By simultaneously forwarding the payload 307 of the first master data telegram 410 over all the user data paths 4, 6, 8, complex projecting of the telegram distribution by the network distributor 100, as would be necessary if a data telegram 300 was to be forwarded only in the direction of those network users 20 to which it is addressed, is also eliminated.

The access indicator of the counter field 308 of the second master data telegram 420 preferably represents all the accesses that took place to the payload fields 306 of the data telegrams 410, 430, 440, 450, 460, 470, 480 while the first master data telegram 410 passed through the master data path 2, the first transmission data telegram 430 and the first reception data telegram 440 passed through the first user data path 4, the second transmission data telegram 450 and the second reception data telegram 460 passed through the second user data path 4 and the third transmission data telegram 470 as well as the third reception data telegram 480 passed through the third user data path 8.

If the data telegrams 410, 420, 430, 440, 450, 460, 470, 480 are EtherCat data telegrams, this can in principle be achieved by forming the numerical value of the access indicator of the second master data telegram 420 from the sum of the numerical values of the access indicators of the first, second and third reception data telegrams 440, 460, 480. However, if an access to the first master data telegram 410 by a network user 20 of the master data path 2 has already taken place, an initial numerical value of the access indicator of the first master data telegram 410 will be different to zero during the reception by the network distributor 100. If the first, second and third transmission data telegrams 430, 450, 470 are exact copies of the first master data telegram 410, then the initial numerical value would be forwarded both over the first user data path 4 and over the second and third user data paths 6, 8. In the case of an addition of the numerical values of the access indicators of the reception data telegrams 440, 460, 480 returning to the network distributor 100, the initial numerical value would then be taken into account three times.

This may be prevented for example by taking over, during the compilation 802 of the transmission data telegrams 430, 450, 470, the initial access indicator only into the counter field 308 of one of the transmission data telegrams 430, 450, 470, for example of the first transmission data telegram 430. The counter fields 308 of the other ones of the transmission data telegrams 430, 450, 470, for example the second and third transmission data telegrams 450, 470, are then set to zero. Another possibility consists in setting the counter fields of all the transmission data telegrams 430, 450, 470 to zero and to buffer the access indicator of the first master data telegram 410 in the network distributor 100. In this case, the access indicator of the second master data telegram 420 may be formed by adding the stored access indicator, the access indicator of the first reception data telegram 440, the access indicator of the second reception data telegram 460 and the access indicator of the third reception data telegram 470.

However, it is also possible to use other methods in order to avoid that the access indicator of the first master data telegram 410 is taken into consideration multiple times during the compilation of the second master data telegram 420. Generally, this is achieved in the case of access indicators formed by numerical values if the access indicator of the second master data telegram 420 corresponds to the sum of the access indicator of the first master data telegram 410, of the access indicator of the first reception data telegram 440 minus the access indicator of the first transmission data telegram 430, of the access indicator of the second reception data telegram 460 minus the access indicator of the second transmission data telegram 450 and of the access indicator of the third reception data telegram 480 minus the access indicator of the third transmission data telegram 470.

Figure 5:
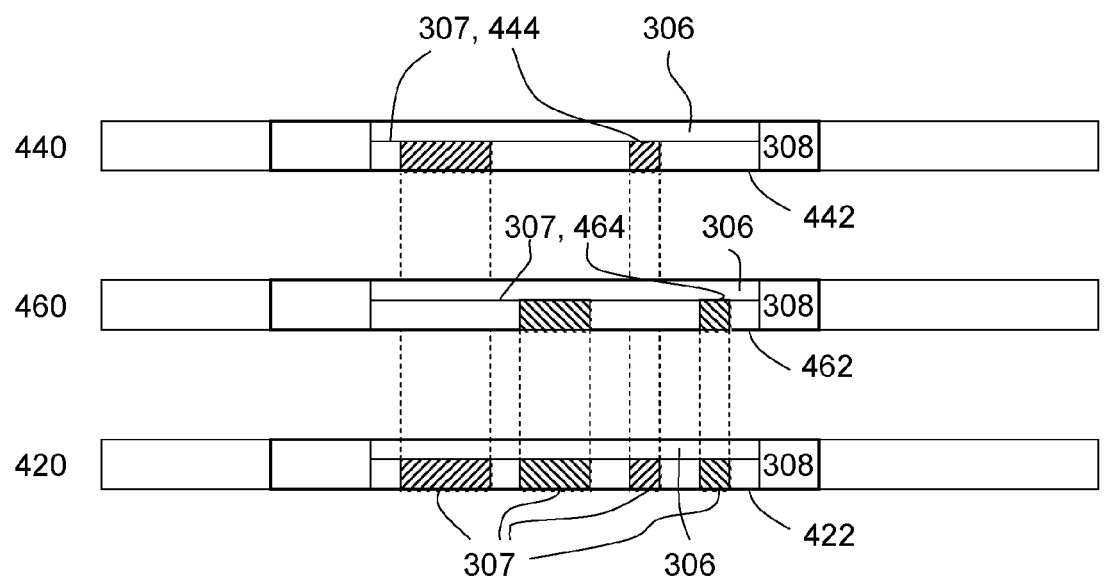
FIG. 5 shows a schematic view for compiling a second master data telegram in a first embodiment.

FIG. 5 shows a schematic view of the compilation 808 of the payload area 306 of a datagram 422 of the second master data telegram 420 from the payload areas 306 of a datagram 442 of the first reception data telegram 440 and of a datagram 462 of the second reception data telegram 460. The third reception data telegram 480 is not shown in FIG. 4 for reasons of clarity. However, its payload area 306 can be involved in an analogous manner in the compilation of the payload area 306 of the second master data telegram 420. For the sake of simplicity, no further datagrams of the reception data telegrams 440, 460 or of the second master data telegram 420 have been shown.

The second master data telegram 420 preferably has the same telegram structure as the reception data telegrams 440, 460, 480 and the individual datagrams have at least the same address value and the same processing command. The payload fields 306 can be described by the network users 20 in such a way that all the payload 307 of the reception data telegrams 440, 460, 480 that is directed to the master 10 may simply be included in the second master data telegram 420. For example, the payload 307 of the datagram 442 of the first reception data telegram 440 that was read out from the network users 20 of the first user data path 4 and is to be transferred to the master 10 forms a first sub-area 444 within the payload area 306. The payload 307 of the datagram 462 of the second reception data telegram 460 that was read out of the network users 20 of the second user data path 6 and is to be transferred to the master 10 then forms a second sub-area 464. Analogously, the payload 307 of a corresponding datagram of the third reception data telegram 480 forms a third sub-area. Here, the first sub-area 440, the second sub-area 464 and the third sub-area do not overlap.

If each of the data telegrams 420, 440, 460, 480 is a read data telegram and if the payload field 306 of the first master data telegram 410 has been initialized with zeros, the payload field 306 of the first reception data telegram 440 does not have any values different from zero in the second sub-area 464 or in the third sub-area. Analogously, the payload field 306 of the second reception data telegram 460 in the first sub-area 444 and in the third sub-area and the payload field 306 of the third reception data telegram 480 in the first and second sub-areas 444, 464 don't have any values different from zero. If the first and second sub-areas 444, 464 as well as the third sub-area do not overlap, the second master data telegram 420 may be compiled in a particularly simple manner by ORing the payload fields 306 of the first reception data telegram 440, of the second reception data telegram 460 and of the third reception data telegram 480.

The OR operation may for example be carried out in a bitwise manner.

Following below is a description, without loss of generality, of individual embodiments partially on the basis of the first and the second reception data telegrams 440, 460 or on the basis of the first and the second transmission data telegrams 430, 450. The embodiments may analogously also be applied to three or more reception data telegrams and transmission data telegrams, respectively.

Apart from payload 307 that is to be transmitted to the master 10 by the network users 20 of the user data paths 4, 6, the first reception data telegram 440 or the second reception data telegram 460 may also contain additional payload 307 that is to be transmitted to the master 10 by the network users 20 of the master data path 2 and had already been written into the payload field 306 of the first master data telegram 410. If the transmission data telegrams 430, 450 were compiled as copies of the first master data telegram 410, both the first reception data telegram 440 and the second reception data telegram 460 contain this payload 307 in identical data positions within their payload fields 306. In the case of an OR operation on the payload fields 306 of the first reception data telegram 440 and of the second reception data telegram 460, the payload 307 that is transferred by the network users 20 of the master data telegram 2 is then included in the second reception data telegram 420 without any interfering doublets occurring.

If each of the data telegrams 420, 440, 460, 480 is a write-read data telegram, the first master data telegram 410 is initialized by the master 10 with the write payload to be written into the network users 20. In the network users 20, read payload to be read out of the network users 20 and to be transmitted to the master 10, is then read into the write-read data telegram. In the course of this, write payload that has already been written into another network user 20, may be overwritten. If read payload has been read into the first sub-area 444 of the first reception data telegram 440 from the network users 20 of the first user data path 4, the payload area 460 of the second reception data telegram 460 still contains write payload in the corresponding data positions. In the case of an OR operation on all the payload fields 306 of the first reception data telegram 440 and the second reception data telegram 460, the read payload would then not be correctly included into the second master data telegram 420.

Figure 6:
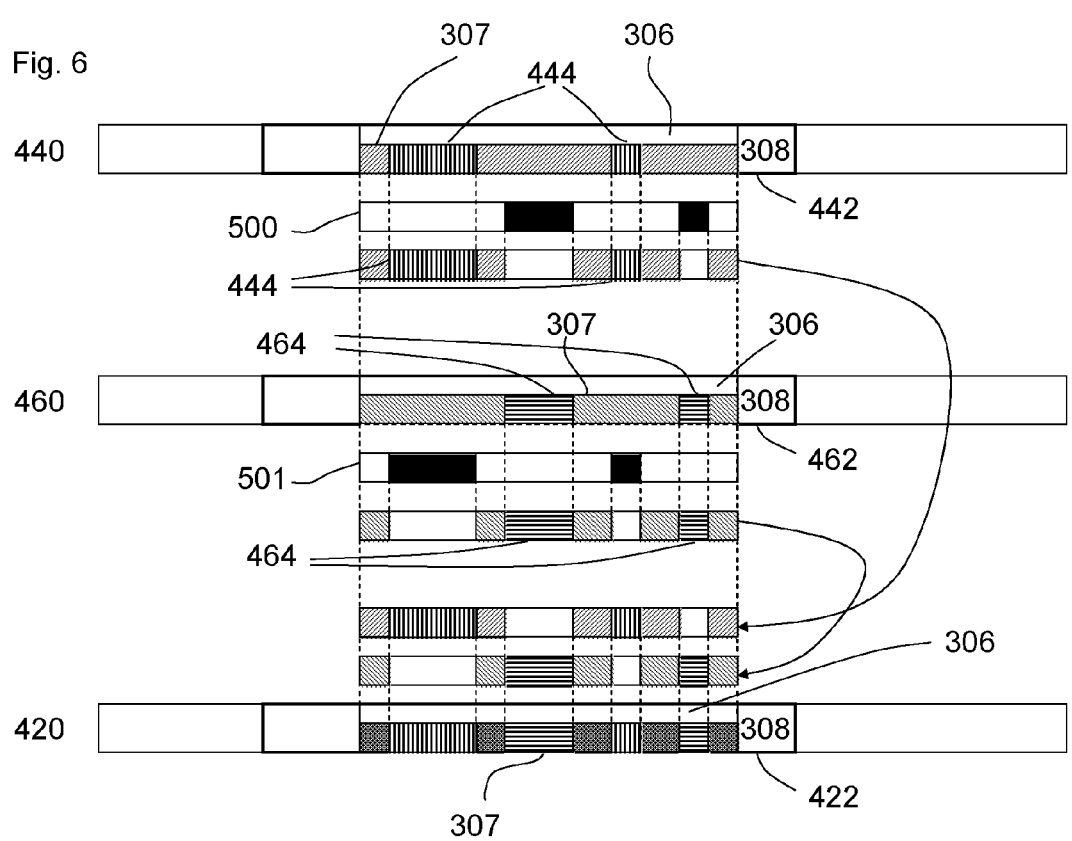
FIG. 6 shows a schematic view of the compilation of the second master data telegram in a second embodiment by means of two data masks.

This can be avoided by configuring the network distributor 100 in such a way that in the case of an OR operation on the payload fields 206, the second sub-area 464 of the payload field 306 of the first reception data telegram 440 is not taken into consideration. Analogously, during an OR operation, the first sub-area 444 of the payload field 306 of the second reception data telegram 460 is not taken into consideration. As schematically shown in FIG. 6, this can be achieved for example by multiplying the payload area 306 of the first reception data telegram 440, prior to the OR operation, by a first data mask 500 and that of the payload area 306 of the second reception data telegram 406 by a second data mask 501. After the multiplication by the first data mask 500, the payload area 306 will not receive any more payload from the first reception data telegram 440 within the second sub-area 464. Analogously, the payload area 306 of the second reception data telegram 460 does not contain any more payload within the first sub-area 444.

In order to achieve this, the first data mask 500 may have the value zero in those data positions of the payload area 306 that correspond to the second sub-area 464, whereas it has the value one at least in all those data positions that correspond to the first sub-area 444. Analogously, the second data mask 501 has the value zero in the data positions of the first sub-area 444 and has the value one in at least the data positions of the second sub-area 464.

Payload 307 that has been written into the first master data telegram 410 by network users 20 of the master data telegram 2 and is each located in identical data positions in the payload areas 306 of the first transmission data telegram 430 and of the second transmission data telegram 450, may be obtained by multiplying the reception data telegrams 440, 460 by the first data mask 500 or the second data mask 501 for a subsequent OR operation, on account of the fact that at least one of the data masks 500, 501, or both data masks 500, 501, have the value one in the corresponding data positions.

In case three reception data telegrams 440, 460, 480 are ORed, the first and second data masks 500, 501 additionally have the value zero at least in the data positions that correspond to the third sub-area. A third data mask, by which the payload area 306 of the third reception data telegram 480 is multiplied, then has a zero at least in the data positions of the first and second sub-areas 444, 464.

The multiplication by the data masks 500, 501 may also be realized by subjecting the data masks with the reception data telegrams 440, 460 or with the payload fields 306 thereof to an AND operation in a bitwise manner.

The master 10 can address the network users with a write-read data telegram in such a way that payload 307 for transmission to the master 10 is read from the second sub-area 464 into the network users of the second user data path 6 and no payload 307 is written into the network users 20 of the first user data path 4. Analogously, in the case of such addressing, no payload 307 is written from the first sub-area 444 into the network users 20 of the second user data path 6. Instead of the first reception data telegram 440 and the second reception data telegram 460, the network distributor 100 can then also multiply the first transmission data telegram 410 and the second transmission data telegram 430 by the first data mask 500 or by the second data mask 501, before it transmits them via the first user data path 4 or the second user data path 6.

A further possibility of avoiding a faulty OR operation on the reception data telegrams 440, 460 is if the network users 20 are designed, in case a transmission data telegram 430, 450 is forwarded towards the end users 40, 42, to read write payload from the payload fields 306 of the transmission data telegram 430, 450 and, in case a reception data telegram 440, 460 is forwarded towards the network distributor 100, to register read payload in the payload fields 306 of the reception data telegram 440, 460. If the first end user 40 and the second end user 42 return the received first transmission data telegram 430 or the received second transmission data telegram 450 as the first reception data telegram 440 and the second reception data telegram 460, respectively, towards the network distributor 100, the end users 40, 42 can fill the data fields 306 with zeros before registering the read payload transferred by them.

Thus, the first reception data telegram 440 and the second reception data telegram 460 have values different from zero only in the data positions of the payload fields 306 when they are received by the network distributor 100, while the network users 20 of the first user data path 4 and the second user data path 6, respectively, have payload 307 registered, whereas the reception data telegrams 440, 460 were transferred back in the direction of the network distributor 100. During a compilation by ORing the payload fields 306 of the first reception data telegram 440 and of the second reception data telegram 460, the second master data telegram 420 then includes all the payload that is supposed to be read from the network users 20 of the user data paths 4, 6 into the master 10. During the transfer of the second master data telegram 420 to the master 10, all the network users 20 of the master data path 2 still enter their read data into the second master data telegram 420. Thus, a configuration of the network distributor 100 for determining the sub-areas to be involved in the OR operation is eliminated.

The network users 20 may have two separate data access devices so as to be able to access simultaneously transmission data telegrams 430, 450 that are located on the route to one of the end users 40, 42, and reception data telegrams 440, 460 that are located on the route back to the network distributor 100. If the data telegrams 300 are EtherCAT data telegrams, the network users 20 are designed to transfer an already processed front part of the data telegram 300 to the next connected network user 20, whilst they are still accessing other parts of the data telegram 300 or are again receiving other parts still from a previous network user 20.

As a result it may occur that the beginning of the data telegram 300 is already passing through a network user 20 as early as on the way back to the network distributor 100 and payload 307 is read from the network user 20 into the front part of the data telegram 300, whilst the end of the data telegram 300 is still passing through the same network user 20 still on its way to one of the end users 40, 42, and payload 307 is still being written from the back part of the data telegram 300 into the network user 20. If the network users 20 have two separate data access devices, the data telegram 300 can in such a situation be processed in a simple manner.

The addressing of the individual network users 20 may be carried out for example directly on the basis of the device or via logical addressing. If the data telegrams 300 are Ether-CAT data telegrams, then each datagram 410, 420 has its own address value in its datagram header data field 305 that establishes the addressing of the associated payload field 306. For the sake of simplicity, and without loss of generality, data telegrams that have a single address value will be taken into consideration here.

In the case of logical addressing, all the network users 20 have read or write access to a unitary logical address area. This may for example comprise a memory size of 4 GBytes. The network users used a memory management unit in order to map data areas of the logical address area onto their own local memory. The association of the logical address area with the local memory of the network users 20 may be carried out by way of configuring the memory management units by the master 10. By way of logical addressing it is for example possible to drive a plurality of network users 20 via an address value.

In the case of direct addressing, the network users may for example be addressed via device addresses or via their position within the data network 1. One possibility of addressing via the position is the use of autoinc data telegrams. These have an address value that is incremented by each network user 20 they pass through. If upon arrival at the network user 20 the address value corresponds to a previously established value, this network user 20 is addressed and carries out read or write accesses to the autoinc data telegram.

For example, the master 10 can initialize the autoinc data telegram using a negative address value, and on forwarding, the network users 20 increment the address value in each case by one. If a network user 20 reaches an autoinc data telegram with the address value zero, then the corresponding network user 20 is addressed and accesses the autoinc data telegram.

If the first master data telegram 410 is designed as an autoinc data telegram and the network distributor 100 compiles the first transmission data telegram 430 and the second transmission data telegram 450 by copying the first master data telegram 410, it can change the address value of the second transmission data telegram 450 in order to achieve a correct addressing of the network user 20 of the second user data path 6. If the address value is incremented by one for each network user 20 passed through, the network distributor 100 can increment the address value taken from the first master data telegram 410 into the second transmission data telegram 450, in order to increase the number of network users 20 in the first user data path 4. Thus, the network users 20 of the second user data path 6 are addressed in the same way as if the second transmission data telegram 450 had previously passed through the network users 20 of the first user data path 4.

Analogously, the network distributor 100 can increase the address value taken from the first master data telegram 410 into the second transmission data telegram 470 by the number of network users 20 in the first and second user data paths 4, 6. Analogously, this method may be continued also when the network distributor 100 is connected to further user data paths. Instead of carrying out the addition in the second and third transmission data telegrams 450, 470, it may accordingly also be carried out in the first transmission data telegram 430 and a further one of the transmission data telegrams 450, 470.

The master 10 can evaluate the address value of the returning second master data telegram 420, for example in order to check whether all network users 20 have been passed through. To this end, the network distributor 100 can use an address value when compiling the second master data telegram 420, which corresponds to the passage through the total number of network users 20 of the first, second and third user data paths 4, 6, 8. In case the address value is increased by one for each network user 20 passed through, the network distributor 100 forms the address value of the second master data telegram 420 as the sum of the address value of the first master data telegram 410 upon reception by the network distributor 100 and the number of network users 20 in the user data paths 4, 6, 8.

This may be achieved for example on account of the fact that the network distributor 100 calculates the difference from the address value the first reception data telegram 440 had upon reception by the network distributor 100, and the address value the first transmission data telegram 430 had during the transfer to the first network user 30. Analogously, the differences between the address values of the second and third reception data telegrams 460, 480 and the second and third transmission data telegrams 450, 470, respectively, is determined by the network distributor 100. The address value of the second master data telegram 420 may then be formed by adding these three differences to the address value the first master data telegram 410 had when it was received by the network distributor 100.

Figure 7:
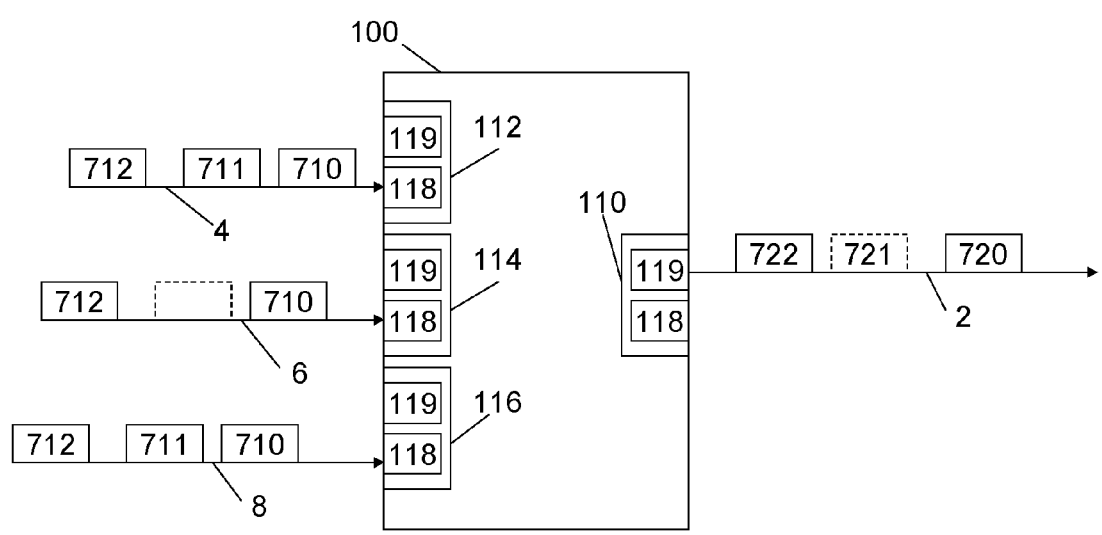
FIG. 7 shows a schematic view of the transmission of a sequence of data telegrams by a network distributor.

FIG. 7 shows a schematic view of the transfer of successive data telegrams by the network distributor 100. From the first user data path 4, the second user data path 6 and the third user data path 8, in each case one first follow-on reception data telegram 710, a subsequent second follow-on reception data telegram 711 and a subsequent third follow-on reception data telegram 712 reach the network distributor 100. Merely the first follow-on reception data telegram 710 and the third follow-on reception data telegram 712 reach the network distributor 100 over the second user data path 6. The second follow-on reception data telegram 711 is not transferred to the network distributor 100 over the second user data path 6, for example because it was previously discarded because of a data error or because it got lost in a different way.

The first follow-on reception data telegrams 710, 711, 712 of the first user data path 4 each correspond to the first reception data telegram 440 according to FIG. 2. Analogously, the second follow-on reception data telegrams 710, 711, 712 of the second user data path 6 and of the third user data path 8 each correspond to the second reception data telegram 460 and the third reception data telegram 480, respectively.

The network distributor 100 compiles a first follow-on master data telegram 720 from the three first follow-on reception data telegrams 710 and transfers it to the master 10 over the master data path 2. Since no second follow-on reception data telegram 711 reaches the network distributor 100 over the second user data path 6, the payload 307 that would have been contained in the non-transferred second follow reception data telegram 711 is missing for the compilation of a second follow-on master data telegram 721. In order to avoid a faulty compilation of the second follow-on master data telegram 721, the network distributor 100 discards the second follow-on reception data telegrams 711 received via the first and third user data paths 4, 8 and does not transfer a second follow-on master data telegram 721. Subsequently, a third follow-on reception data telegram 712 reaches the network distributor 100 again on each of the user data paths 4, 6, 8, from which the network distributor compiles a third follow-on master data telegram 722 and transfers it to the master 10 over the master data path 2.

In order to determine that the second follow-on reception data telegram 711 is missing on the second user data path 6, the network distributor 100 can then for example check in which time intervals the follow-on reception data telegrams 710, 711, 712 arrive over the user data paths. If within a specified waiting time after the reception of a data telegram on a first one of the user data paths 4, 6, 8 no data telegram reception occurs on another one of the user data paths 4, 6, 8, the follow-on reception data telegram 710, 711, 712 received on the first one of the user data paths 4, 6, 8 is discarded and is not used for the compilation of the follow-on master data telegram 720, 721, 722.

In the situation shown in FIG. 7, no data telegram reception takes place over the second user data path 6 within the stipulated waiting time for example after the reception of the second follow reception data telegram 711 on the first user data path 4. Therefore, the second follow-on reception data telegrams 711 received over the first user data path 4 and the third user data path 8 are discarded by the network distributor 100.

In order to be able to determine a loss of one of the follow-on reception data telegrams 710, 711, 712, the follow-on reception data telegrams 710, 711, 712 may also include identifiers. In this case, for example the first follow-on reception data telegrams 710 have a first identifier, the second follow-on reception data telegrams 711 have a second identifier that is different from the first identifier and the third follow-on reception data telegrams have a third identifier which, however, may again be different from the first and second identifiers.

The first, second and third identifiers may be deposited in the network distributor 100. If data telegram reception has at least started on all of the user data paths 4, 6, 8, the network distributor 100 can check whether the identifiers of the reception data telegrams match an expected identifier. If this is the case with all of the reception data telegrams, the network distributor 100 compiles the corresponding follow-on master data telegram from these reception data telegrams. Otherwise, it will discard the reception data telegrams that are no longer needed.

If the transmission data telegrams 430, 450, 470 are forwarded by the end users as reception data telegrams 440, 460, 480, the identifiers may for example be inserted into the transmission data telegrams 430, 450, 470 by the network distributor 100. They can map for example the MAC address of the network distributor 100. As a result, the order of the identifiers of the reception data telegrams is automatically deposited in the network distributor 100.

The structure of the data network 1 as shown in FIG. 1 is only one example of how the network distributor 100 may be used. In particular, the data network 1 may comprise more or less than the four data paths 2, 4, 6, 8 shown. Also, additional network users 20 may be connected to the data network 1. It is also possible to use more than one network distributor 100 in the data network 1 and to achieve in this way a further branching of the data network 1.

The network distributor 100 may also be formed as a data processing network user which itself accesses the payload 307. In this context, the data access may for example be carried out to the first master data telegram 410, once this has been received by the data-processing network user. However, it may also be carried out to the first, second or third transmission data telegrams 430, 450, 470, before the latter are forwarded to the first, second and third network user 30, 32, 34, respectively, via the corresponding user interfaces 112, 114, 116.

Moreover, data access by the data-processing network user is also possible to one of the reception data telegrams 440, 460, 480, once these have been received by the data processing network user. Finally, also the payload area 306 of the second master data telegram 420 may be accessed by the data processing network user, before the second master data telegram 420 is transferred to the master 10 via the master interface 110. It is also possible to combine a number of these data accesses, for example if during the transfer of the data telegram towards the end users 40, 42, 44 payload 307 is only written into the network users 20, and during the transfer of the data telegram towards the master 10, payload 307 is only read out of the network users 20.

One embodiment of the network distributor 100 as a data processing network distributor also falls into the scope of the present description. In this context, the data processing part of the data processing network distributor is to be regarded as a conventional network user 20 that is to be provided in the user data path 2, 4, 6, 8, via which the data telegram 410, 420, 430, 440, 450, 460, 470, 480 accessed by the data processing network distributor is transmitted.

The second master data telegram 420 may also be compiled without ORing the payload areas 306 of the reception data telegrams 440, 460, 480. All the payload 307 from the reception data telegrams 440, 460, 480 to be transmitted to the master 10 is taken into the second master data telegram 420. For example, the network users 20 may be configured in such a way that the network users 20 of the first user data path 4 write the payload 307 to be transferred by them to the master 10 only into the payload area 306 of the first datagram 310 and the network users 20 of the second user data path 6 write the corresponding payload 307 only into the payload field 306 of the second datagram 320. The users of the third user data path 8 could then write their payload 307 exclusively into the payload area 306 of a further datagram. The network distributor 100 can then compile the second master data telegram 420 by taking over the first datagram 310 from the first reception data telegram 440, the second datagram 460 from the second reception data telegram 460 and the further datagram from the third reception data telegram 480.

A data network in linear topology in principle allows a rapid dispatch of data telegrams since data telegrams are immediately forwarded by a network distributor to a specified next network distributor and no projecting of the dispatch of data telegrams needs to be carried out. Unlike a data network in which a data telegram is forwarded in a targeted manner to an addressed network user, it is not necessary for example for a network distributor to determine which data path the address network user is connected to.

Particularly in the case of a data network according to the EtherCAT standard, a data telegram passing through can be read out and written to quickly and without buffering as a result of the fact that a data access to the payload fields of a data telegram passing through is carried out.

If real-time communication with a specified cycle time is to be carried out in a data network in linear topology, the maximum number of network users that can be connected to such a data network is limited by the run time of a data telegram through the entire data network. If the run time reaches the cycle time, no further network users can be connected to the data network.

This limitation can be avoided by a network distributor 100 forwarding an incoming first master data telegram 410 as transmission data telegrams 430, 450, 470 in all user data paths 4, 6, 8 substantially at the same time and without any delay. Subsequently, the network users 20 of the individual user data paths 4, 6, 8 can simultaneously access the payload fields 306 of the transmission data telegrams 430, 450, 470. By returning the transmission data telegrams 430, 450, 470 as reception data telegrams 440, 460, 480 to the network distributor 100, read payload can be transmitted back from the network users 20 to the network distributor 100 and from there towards the master 10.

As a result of the subdivision of the first master data telegram 410, the compilation of a second master data telegram 420 from the payload of the incoming reception data telegrams 440, 460, 480 and the adapted takeover of the access indicators into the second master data telegram 420, the structure of the data telegrams from the viewpoint of the master 10 does not change in a branched design of the data network 1. The master can address the network users 20 in the same way in which it would also address them in a data network in which a data telegram 300 successively passes through all the network users 20.

At the same time, by compiling the transmission data telegrams 430, 450, 470 by copying the first master data telegram 410 and by compiling the second master data telegram 420 by ORing the payload fields 306 of the reception data telegrams 440, 460, 480 in a bitwise manner, the calculation effort required by the network distributor 100 for the forwarding and merging of the data telegrams is kept advantageously low. Copying and ORing may be carried out for example in parallel to the reception of the first master data telegram 410 or the reception data telegrams 440, 460, 480.

By subdividing a first master data telegram 410 into a plurality of transmission data telegrams 430, 450, 470 and subsequently merging a plurality of reception data telegrams 440, 460, 480 into a second master data telegram 420 it can, apart from speeding up the data transmission, also be achieved that in the case of a telegram loss in one of the user data paths 4, 6, 8, at least the read payload from the remaining user data paths 4, 6, 8 can be transferred to the master 10. To this end, the read payload of the reception data telegrams 440, 460, 480 arriving at the network distributor 100 is inserted into a second master data telegram 420, so that the latter is at least partially filled with read payload.

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A method for transferring data telegrams each with at least one payload field in a data network with network users and a network distributor that has a master interface, a first user interface and a second user interface, wherein the master interface is connected to a master over a master data path, the first user interface is connected to at least one first network user over a first user data path, and the second user interface is connected to at least one second network user over a second user data path, and wherein the method comprises the following steps:

receiving a first master data telegram sent by the master through the network distributor via the master interface connected to the master data path, compiling a first transmission data telegram and a second transmission data telegram through the network distributor, transferring the first transmission data telegram to the first network user via the first user interface connected to the first user data path and the second transmission data telegram to the second network user through the network distributor via the second user interface connected to the second user data path, receiving a first reception data telegram sent by the first network user over the first user data path via the first user interface and a second reception data telegram sent by the second network user over the first user data path via the second user interface through the network distributor, compiling a second master data telegram through the network distributor, and transferring the second master data telegram via the master interface to the master through the network distributor, wherein the first master data telegram, the second master data telegram, the first and second transmission data telegrams and the first and second reception data telegrams each have a counter field with an access indicator that indicates an access to the payload field through one of the network users, and wherein the access indicator of the second master data telegram is compiled in order to represent accesses to payload fields of the first master data telegram, of the first transmission data telegram, of the second transmission data telegram, of the first reception data telegram and of the second reception data telegram.

2. The method as claimed in claim 1, wherein the access indicator of the second master data telegram corresponds to at least the sum of the access indicator of the first master data telegram, of the access indicator of the first reception data telegram minus the access indicator of the first transmission data telegram, and of the access indicator of the second reception data telegram minus the access indicator of the second transmission data telegram.

3. The method as claimed in claim 2, wherein the access indicator of one of the transmission data telegrams is zero.

4. The method as claimed in claim 1,
wherein the payload fields include payload,
wherein the payload of the first transmission data telegram and the payload of the second transmission data telegram each comprise, after compilation by the network distributor, at least part of the payload of the first master data telegram, and
wherein the payload of the second master data telegram comprises, after compilation by the network distributor, part of the payload of the first reception data telegram and part of the payload of the second reception data telegram.

5. The method as claimed in claim 1, wherein the payload field of the first transmission data telegram and/or the payload field of the second transmission data telegram are compiled as a copy of the payload field of the first master telegram.

6. The method as claimed in claim 1, wherein the network distributor compiles one of the transmission data telegrams by transmitting the first master data telegram as a first or second transmission data telegram via the first and second user interface, respectively.

7. The method as claimed in claim 1,
wherein the payload field of the first master data telegram, of the second master data telegram, of the first and second transmission data telegrams and of the first and second reception data telegrams each have the same size,
wherein the payload field of the second master data telegram contains payload from a first sub-area of the payload field of the first reception data telegram and payload from a second sub-area of the payload field of the second reception data telegram, and
wherein the first sub-area and the second sub-area do not overlap.

8. The method as claimed in claim 1, wherein the network distributor, during the compilation of the payload field of the second master data telegram, subjects the payload field of the first reception data telegram to an OR operation with the payload field of the second reception data telegram.

9. The method as claimed in claim 8, wherein the network distributor multiplies, during the compilation of the second master data telegram, the payload field of the first reception data telegram by a first data mask and the payload field of the second reception data telegram by a second data mask.

10. The method as claimed in claim 8, wherein the network distributor multiplies, during the compilation of the first transmission data telegram, the payload field of the first master data telegram by a third data mask and, during the compilation of the second transmission data telegram, multiplies the payload field of the first master data telegram by a fourth data mask.

11. The method as claimed in claim 8,
wherein the network users of one of the user data paths are arranged in a line,
wherein a last network user in the line converts one of the transmission data telegrams of the network distributor into one of the reception data telegrams,
wherein at least part of the payload field of the one of the reception data telegrams is set to zero and returns the one of the reception data telegrams to the network distributor,
wherein the one of the transmission data telegrams and the one of the reception data telegrams pass through all the network distributors of the one of the user data paths, and the network users only carry out read accesses to the payload field of the one of the transmission data telegrams and only carry out write accesses to the payload field of the one of the reception data telegrams.

12. The method as claimed claim 1,
wherein the data telegrams are autoinc data telegrams which have at least one address value and which address the network users via a position within the data network, and
wherein an address value of the second transmission data telegram corresponds to an address value of the first master data telegram plus a number of network users connected to the first user data path.

13. The method as claimed in claim 12, wherein an address value of the second master data telegram corresponds at least to the sum of an address value of the first master data telegram plus the number of network users connected to the first user data path and plus a number of network users connected to the second user data path.

14. The method as claimed in claim 1, wherein the network distributor compiles the second master data telegram, after receiving the first reception data telegram via the first user interface or after receiving the second reception data telegram via the second user interface, if no error occurs during the reception of the respectively other reception data telegram via the respectively other user interface.

15. The method as claimed in claim 14, wherein the error consists in that the network distributor does not receive within a specified waiting time after having received the first or second reception data telegram via the first and second user interface, respectively, a reception data telegram via the respectively other user interface.

16. The method as claimed in claim 14,
wherein the first reception data telegram and the second reception data telegram include identifiers, and
wherein the error consists in that the identifier of the reception data telegram received via the respectively other user interface does not match an expected identifier.

17. The method as claimed in claim 1, wherein the data network is an Ethernet network, in particular an EtherCAT network.

18. The method as claimed in claim 1, wherein the first and second transmission data telegrams are simultaneously transmitted by the network distributor.

19. The method as claimed claim 1,
wherein the network distributor has a memory area, and
wherein the first reception data telegram received via the first user interface is stored in the memory area by the network distributor, if the reception of the first reception data telegram takes place prior to the reception of the second reception data telegram via the second user interface, and
wherein the second reception data telegram received via the second user interface is stored by the network distributor in the memory area, if the reception of the second reception data telegram takes place prior to the reception of the first reception data telegram via the first user interface.

20. The method as claimed in claim 1, wherein the network distributor is integrated into a network user that carries out read and/or write accesses to the payload field of one or more of the first or second master data telegrams, of the first or second transmission data telegrams or of the first or second reception data telegrams.

21. A network distributor having a master interface, a first user interface and a second user interface, designed for transferring data telegrams each with at least one payload field in a data network with network users and a network distributor that has a first user interface and a second user interface,
- wherein the master interface is connected to a master over a master data path, the first user interface is connected to at least one first network user over a first user data path, and the second user interface is connected to at least one second network user over a second user data path, and
- wherein the network distributor comprises a memory area coupled to a data processor configured for:
  - receiving a first master data telegram sent by the master through the network distributor via the master interface connected to the master data path,
  - compiling a first transmission data telegram and a second transmission data telegram through the network distributor,
  - transferring the first transmission data telegram to the first network user via the first user interface connected to the first user data path and the second transmission data telegram to the second network user through the network distributor via the second user interface connected to the second user data path,
  - receiving a first reception data telegram sent by the first network user over the first user data path via the first user interface and a second reception data telegram sent by the second network user over the first user data path via the second user interface through the network distributor,
  - compiling a second master data telegram through the network distributor, and
  - transferring the second master data telegram via the master interface to the master through the network distributor,
- wherein the first master data telegram, the second master data telegram, the first and second transmission data telegrams and the first and second reception data telegrams each have a counter field with an access indicator that indicates an access to the payload field through one of the network users, and
- wherein the access indicator of the second master data telegram is compiled in order to represent accesses to payload fields of the first master data telegram, of the first transmission data telegram, of the second transmission data telegram, of the first reception data telegram and of the second reception data telegram.

22. A data network having a master, at least one first and one second network user and a network distributor according to claim 21,
- wherein the master is connected to a master data path, the first network user is connected to a first user data path and the second network user is connected to a second user data path, and
- wherein the network distributor is connected to the master data path via the master interface, to the first user data path via the first user interface and to the second user data path via the second user interface.

* * * * *